(12) United States Patent
Rosenzweig (10) Patent No.: US 7,500,427 B2
(45) Date of Patent: Mar. 10, 2009

(54) BASKET FOR DEEP FRYER AND METHODS OF COOKING FOOD PRODUCTS

(75) Inventor: Mark Rosenzweig, Chestnut Hill, MA (US)

(73) Assignee: Euro-Pro Operating LLC, West Newton, MA (US)

( * ) Notice: Subject to any disclaimer, the term of this patent is extended or adjusted under 35 U.S.C. 154(b) by 716 days.

(21) Appl. No.: 10/966,107

(22) Filed: Oct. 18, 2004

(65) Prior Publication Data

US 2005/0204929 A1 Sep. 22, 2005

Related U.S. Application Data

(60) Provisional application No. 60/553,535, filed on Mar. 17, 2004.

(51) Int. Cl.
*A47J 37/12* (2006.01)
(52) U.S. Cl. ............................. 99/407; 99/410; 99/416; 99/450; 426/438
(58) Field of Classification Search ................... 99/407, 99/410, 411, 412, 413, 414, 416, 450; 426/438, 426/440, 441, 520, 523
See application file for complete search history.

(56) References Cited

U.S. PATENT DOCUMENTS

| 2,393,420 | A | * | 1/1946 | Scheuplein | 99/403 |
| 2,907,659 | A | * | 10/1959 | Anetsberger et al. | 426/438 |
| 4,508,027 | A | * | 4/1985 | McCord | 99/416 |
| 4,854,227 | A | * | 8/1989 | Koopman | 99/416 |
| 6,386,094 | B1 | * | 5/2002 | Stevenson et al. | 99/410 |
| 2002/0017198 | A1 | * | 2/2002 | Gauthier et al. | 99/330 |

* cited by examiner

*Primary Examiner*—Reginald L Alexander
(74) *Attorney, Agent, or Firm*—Womble Carlyle (57) ABSTRACT

A basket assembly for use with a deep fryer having a lower foraminous basket and an upper foraminous insert which quickly and easily attaches to the lower basket at a predetermined location intermediate the top and bottom of the lower basket to thereby hold the food in place beneath the surface of a hot cooking liquid such as oil. Advantages of the assembly are that it forces foods down to increase the efficiency of flash frying, it provides the ability to cook more than one item at a time while keeping them separated, and it provides a food product which cooks faster because it is unnecessary to turn food which floats to the top, thereby resulting in less fat absorption.

10 Claims, 12 Drawing Sheets

BASKET FOR DEEP FRYER AND METHODS OF COOKING FOOD PRODUCTS

BACKGROUND AND SUMMARY OF THE INVENTION

This invention relates to deep fryers and, more particularly, this invention relates to a basket for use in a deep fryer such as a deep fat fryer. Still more particularly, this invention relates to a basket having an insert which nests in the basket to hold food products beneath the surface of the cooking liquid such as molten fat or oil (hereinafter referred interchangeably to as "fat" or "oil") and to methods of cooking food products in the basket assembly.

Deep fryers are commonly used in both industry, such as restaurants and processors of food to be sold at retail or wholesale, and homes. A typical deep fryer includes a receptacle to hold the cooking liquid and means for heating the cooking liquid. The means is ordinarily an electrically powered heating element which, together with the receptacle is sold as a so-called deep fryer or deep fat fryer. For purposes of this invention, deep fryers are not limited to such units but may simply be a pot or sauce pan placed on a stove. The food is usually placed in a foraminous basket which is then lowered into the heated fat, or it may be dropped into the heated fat in which the basket is already placed. A typical such basket is that designated by the numeral 20 in U.S. Pat. No. 4,508,027 to McCord, which is incorporated herein in its entirety by reference. McCord teaches a device which comprises a vertical partition to be inserted into the basket to enable the user to cook different food products at the same time but to be separated while doing so.

Most food products which are deep fried tend to rise to the top of the hot oil. In order to assure uniform cooking, therefore, the user must constantly push the food below the surface of the hot oil or turn it over to thereby obtain the uniformity of cooking which is desired. In some commercial establishments when frying french fries or onion rings, the food is pushed below the surface of the hot oil by placing an empty basket into the mouth of the basket holding the food. This is mentioned in U.S. Pat. No. 4,321,859 to Rimmeir. As taught by Rimmeir, however, in the case of onion rings, this results is a "loaf" of onion rings which is esthetically displeasing and unduly greasy for most people's tastes. Remmeir solved that problem by providing a cover with a plurality of downwardly projecting rod-like members.

Other specialized devices have been developed to provide a proper environment for frying particular types of food products such as tacos, chips, pies, and the like. See U.S. Pat. Nos. 6,386,094, 4,232,596, 4,006,675, 3,424,076, 4,854,227, and published U.S. Patent Application No. 2002/0017198, for example.

None of these publications teaches a satisfactory solution to the problem of uneven cooking caused by food rising to the surface of the hot oil. In commercial establishments such as restaurants the workers are usually busy attending to numerous tasks and cannot stand in one place tending to the fryer. In the case of home use, constantly hovering over the fryer to push the food down or turn it over is a tedious task. The user also has other tasks to be accomplished and turning his or her attention to those tasks leaves the deep fryer unattended. There is a need, therefore, for a device which would simply and easily provide the necessary environment for frying food products without the need to pay constant attention to the fryer.

It is, therefore, an object of the present invention to provide a basket assembly for use with a deep fryer which is free of the aforementioned and other such disadvantages.

It is another object of the present invention to provide a basket assembly for use with a deep fryer comprising a lower foraminous basket and an upper foraminous insert which quickly and easily attaches to the lower basket at a predetermined location intermediate the top and bottom of the lower basket to thereby hold the food in place beneath the surface of the hot cooking liquid.

Advantages of the instant inventive assembly are that it forces foods down to increase the efficiency of flash frying, it provides the ability to cook more than one item at a time while keeping them separated, and it provides a food product which cooks faster because it is unnecessary to turn food which floats to the top, thereby resulting in less fat absorption.

These and other objects are achieved by providing a foraminous basket with an insert which is placed at a predetermined location within the basket in an essentially horizontal position and locked in position to thereby hold food products below the surface of the oil when the basket assembly is placed in the deep fryer. The basket has a removable handle which extends upwardly and outwardly to enable the user easily and safely manipulate the basket. The basket is foraminous and is preferably made of a wire mesh. The insert is also foraminous and is preferably made of a wire mesh. The insert is essentially flat, being dimensioned to fit within the basket with a reasonably loose tolerance which allows easy ingress and egress but does not allow food products located below the insert to escape around its edges. The insert is removably held in place by press-fit locking means. The insert also has a handle which extends upwardly to a height higher than the handle of the basket and outwardly thereby enabling the user to easily and safely manipulate the insert.

It is to be noted that while this invention has been described by reference to its use in a deep fat fryer, it can equally well be used in connection with other types of cooking such as poaching fish in a court bouillon, cooking chicken in some other liquid, or cooking vegetables in a liquid.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
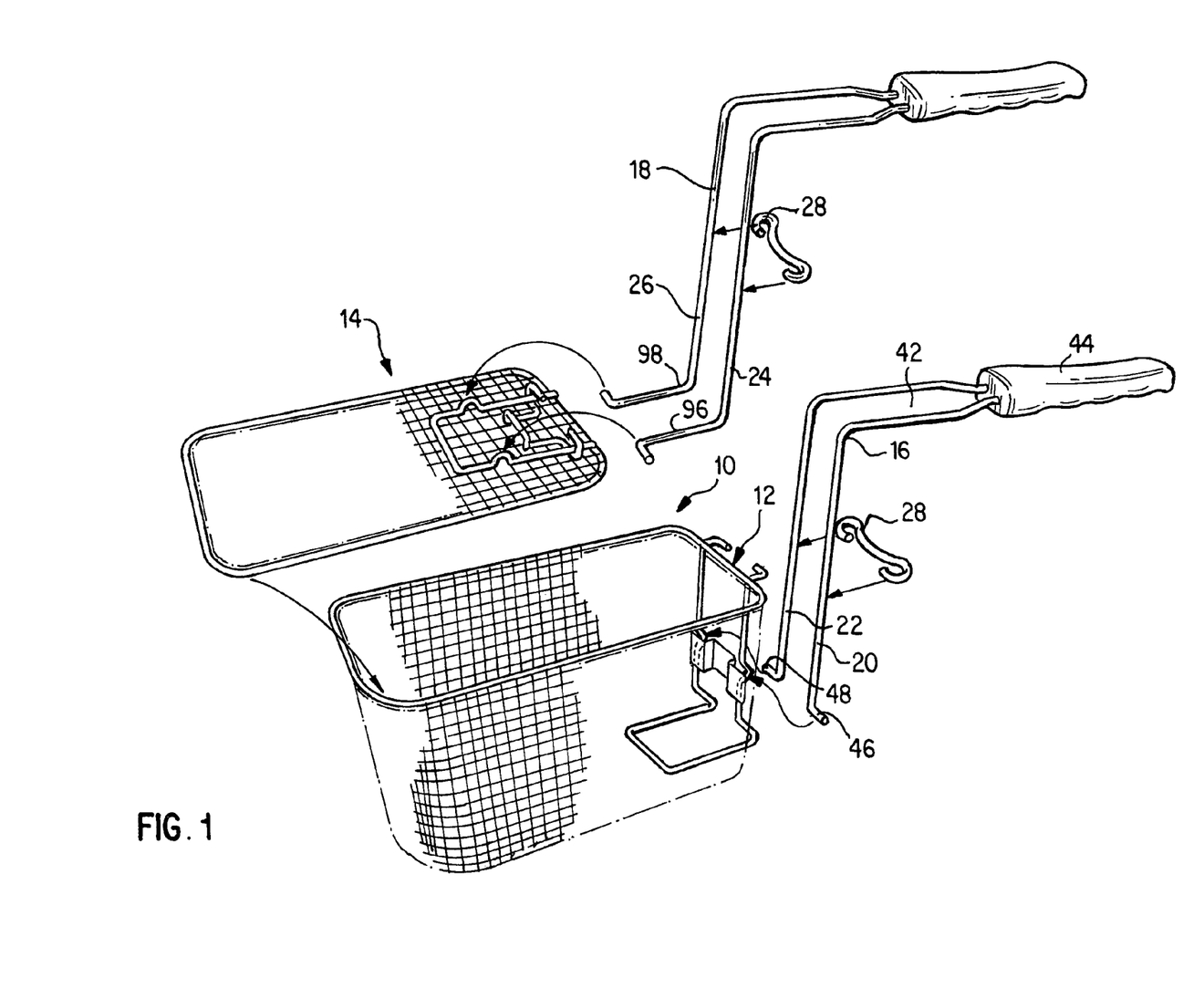
FIG. 1 is an exploded view of the basket assembly of the present invention.

Referring first to FIG. 1, there is seen a basket assembly for a deep fryer generally designated by the numeral 10. The basket assembly 10 comprises a basket 12 and an insert 14. Both basket 12 and insert 14 are constructed of a foraminous material as well-known in the art, preferably a wire mesh. Basket 12 has a handle 16 which is removably affixed to basket 12 in a manner to be described herein below. Similarly, insert 14 has a handle 18 which is removably affixed to basket 12 in a manner to be described herein below. Both handles 16 and 18 are fabricated from a wire of a gauge suitable for the purpose as is well-known in the art. Handle 16 comprises a pair of legs 20 and 22 which can be moved toward each other for attachment to basket 12 and handle 18 comprises a pair of legs 24 and 26 which can be moved toward each other for attachment to insert 14. Once attached a slidable handle support or clip 28 is slid down to hold the legs in place.

Figure 2:
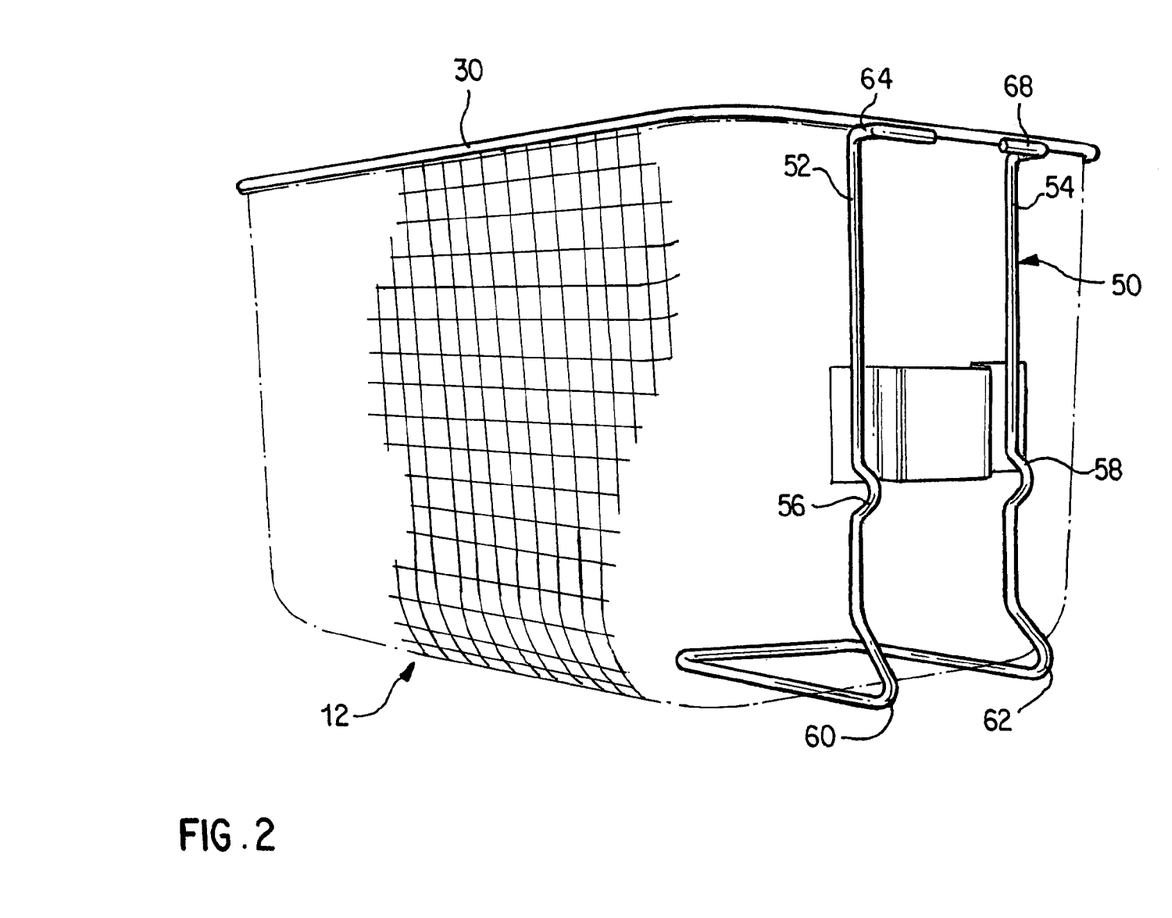
FIG. 2 is a perspective view from the rear and left side of the basket of the present invention.
Figure 3:
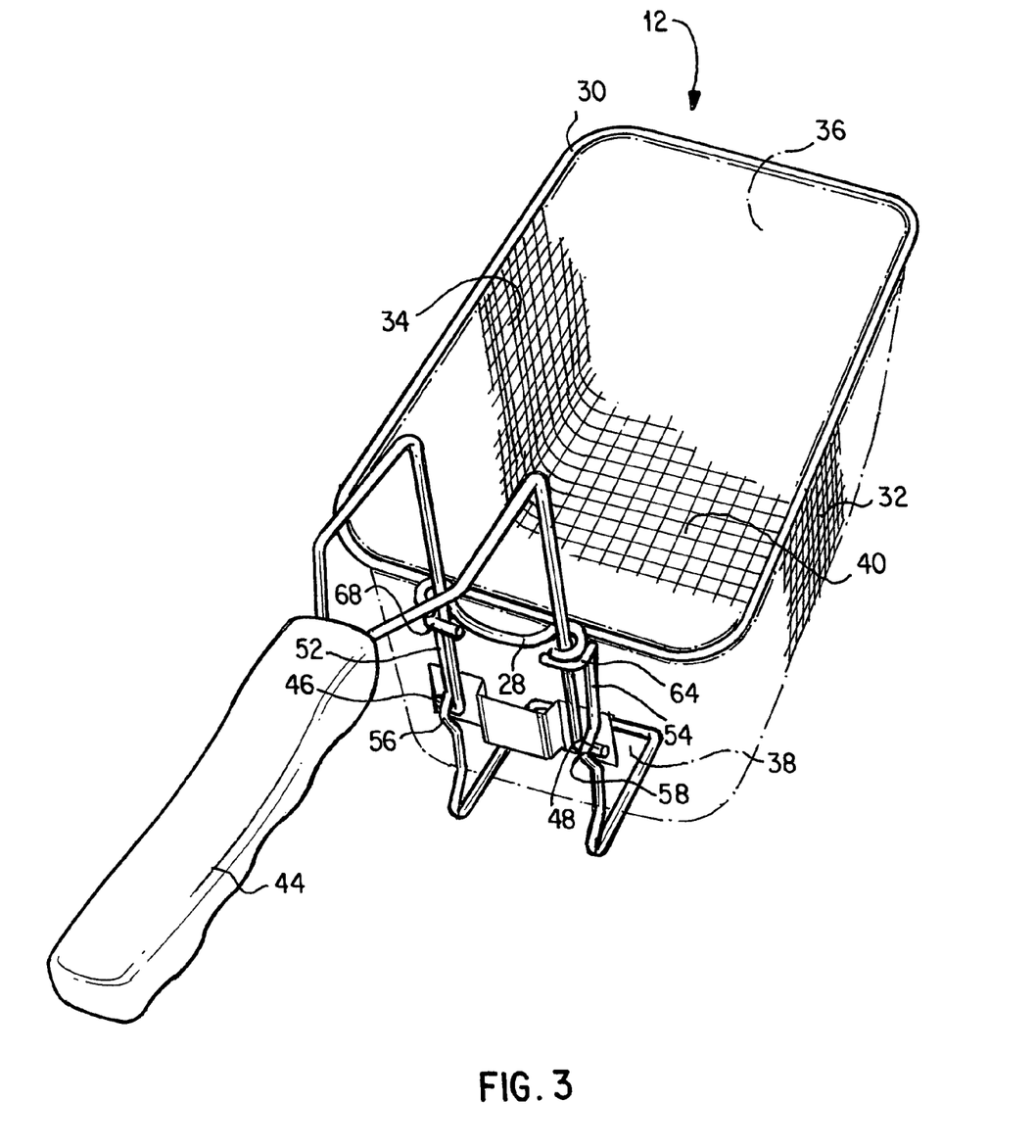
FIG. 3 is a perspective view of the basket of the present invention with the handle in place.

Turning to FIGS. 2 and 3, a preferred construction of basket 12 is seen. Basket 12 comprises a top frame 30 which is of a gauge sufficient to maintain the desired shape. While the basket is shown in the drawings as generally rectangular, it will be appreciated that the shape is chosen to fit the deep fryer in which it is to be used. The basket is a wire mesh depending from frame 30 to form opposed side walls 32 and 34, opposed front and rear walls 36 and 38, and bottom 40. The wire mesh is fixed to frame 30 by spot welding or by any other means well-known in the art.

Handle 16 comprises a portion 42 which is generally horizontal as seen in FIG. 1, portion 42 extending from handle grip 44 and forming separated elements which are then directed downwardly to form legs 20 and 22. Legs 20 and 22 terminate in outwardly directed lugs 46 and 48. Clip 28 is slidingly affixed to handle 16 such that when it is located in the upper, horizontal, portion 42, the legs 20 and 22 can be moved toward each other for insertion into position when attached to the basket 12, but when clip 28 is moved to the lower position, it prevents the legs 20 and 22 from being moved together, thereby locking them in place.

Figure 10:
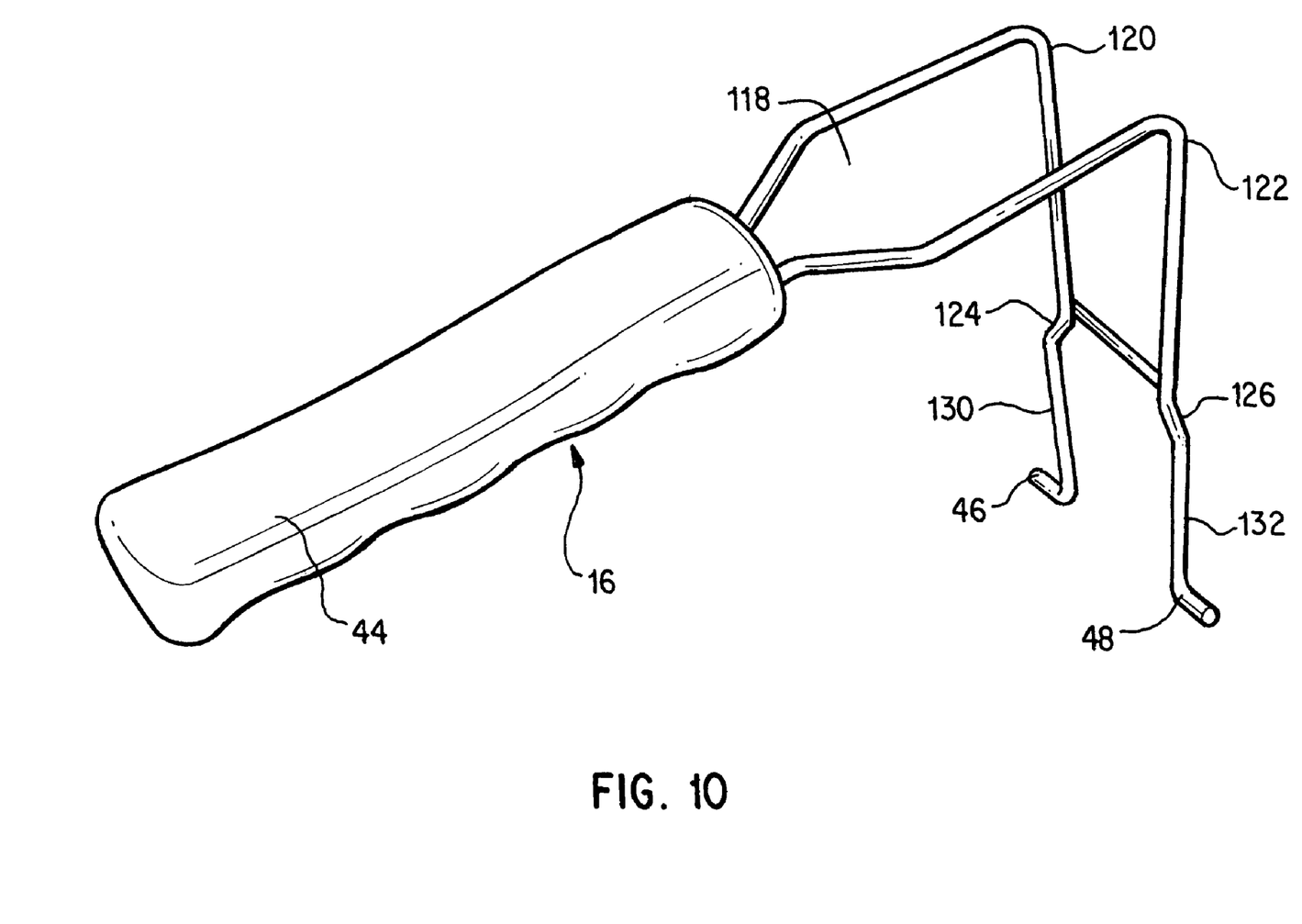
FIG. 10 is a perspective view of a variation of the handle of the basket.

In a variation as shown in FIG. 10, handle 16 comprises a generally horizontal portion 118 extending from handle grip 44 and forming separated elements which are then directed downwardly to form legs 120 and 122. Legs 120 and 122 are bent outwardly at 124 and 126, respectively, and then continue downwardly to terminate in outwardly directed lugs 46 and 48. Instead of a clip 28 as shown in FIG. 1, for instance, a cross-bar 128 is fixed to the legs 120 and 122 in the vicinity of portions 124 and 126 as by welding. This allows the lower portions 130 and 132 of the legs 120 and 122 to retain some resiliency so they can be moved toward each other for insertion into position when attached to the basket 12. Legs 120 and 122 may be shorter than legs 20 and 22.

A frame or bracket 50 of a heavier gauge than the mesh is fixed to the outside of the rear wall 38 by spot welding or by any other means well-known in the art. Frame 50 comprises a pair of legs 52 and 54 each of which has a hook-like protuberance 56 and 58, respectively, to receive lugs 46 and 48 of handle 16. Legs 52 and 54 of frame 50 are bent under the basket to form supporting feet 60 and 62, thereby lending stability to the basket. Legs 52 and 54 terminate at the top in hooks 64 and 68 into which legs 20 and 22 of handle 16 fit to then be locked into place by clip 28.

Figure 11:
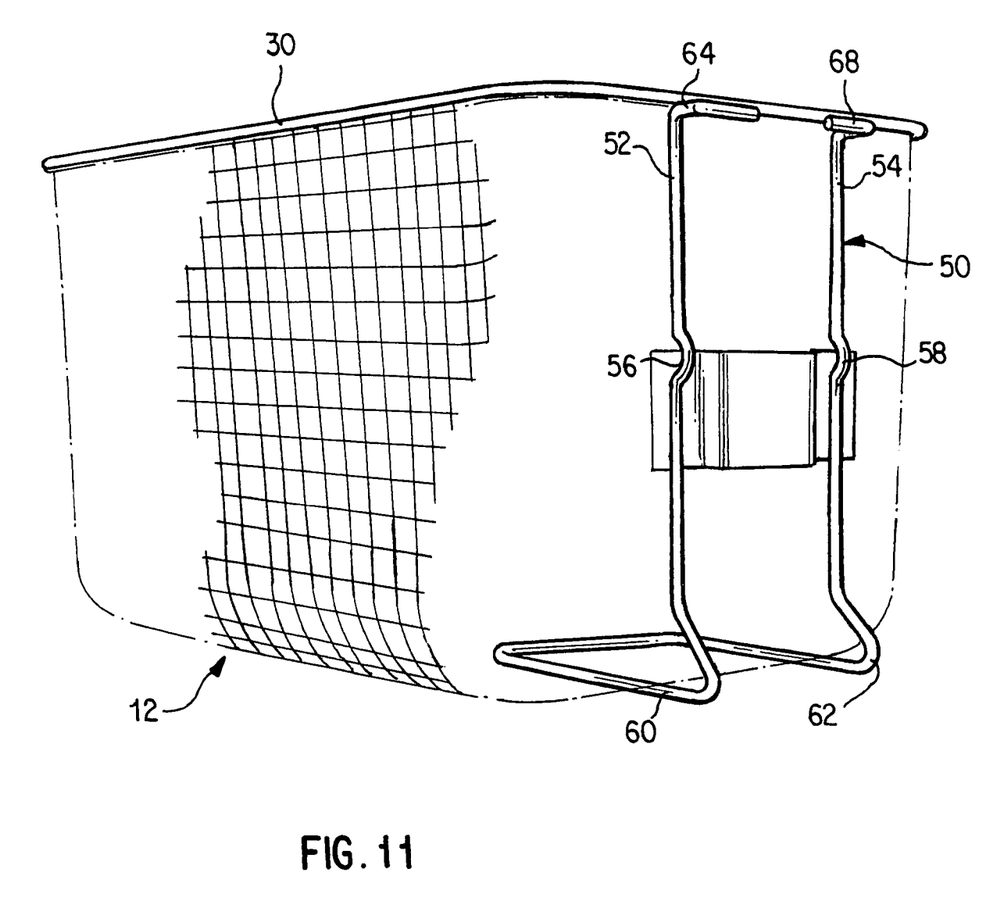
FIG. 11 is a perspective view from the rear and left side of part of a modified basket.

In a variation designed to accept the shorter handle shown in FIG. 10, protuberances 56 and 58 are located somewhat higher as shown in FIG. 11.

Figure 4:
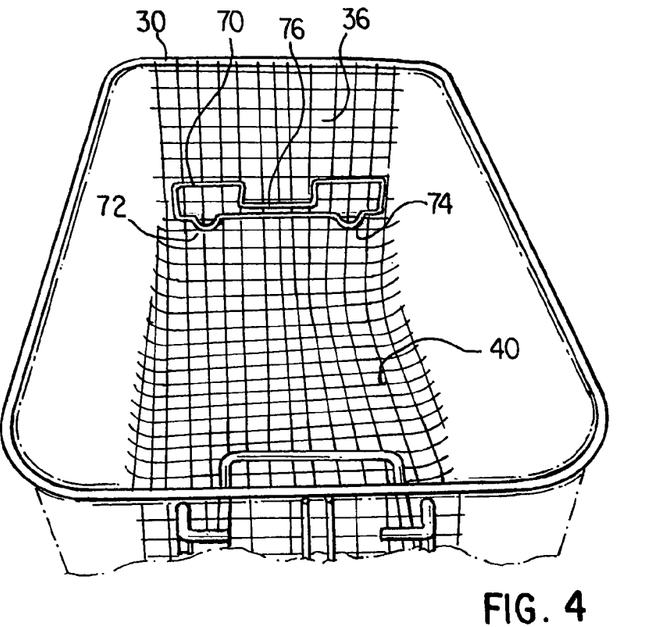
FIG. 4 is an elevational view of the inside front wall of the basket showing the first part of the locking means for the insert.

A first insert support member 70 is fixed by spot welding or any other means well-known in the art at a predetermined location on front wall 36, intermediate the top 30 and the bottom 40 (see FIG. 4). First support member 70 has a pair of inwardly extending protuberances 72 and 74 on which one end of the insert 14 will rest and a step 76 extending inwardly and slightly downwardly to lock the insert 14 in place. Step 76 and protuberances 72 and 74 are spaced apart sufficiently to allow insertion and subsequent locking in place of the insert 14.

Figure 5:
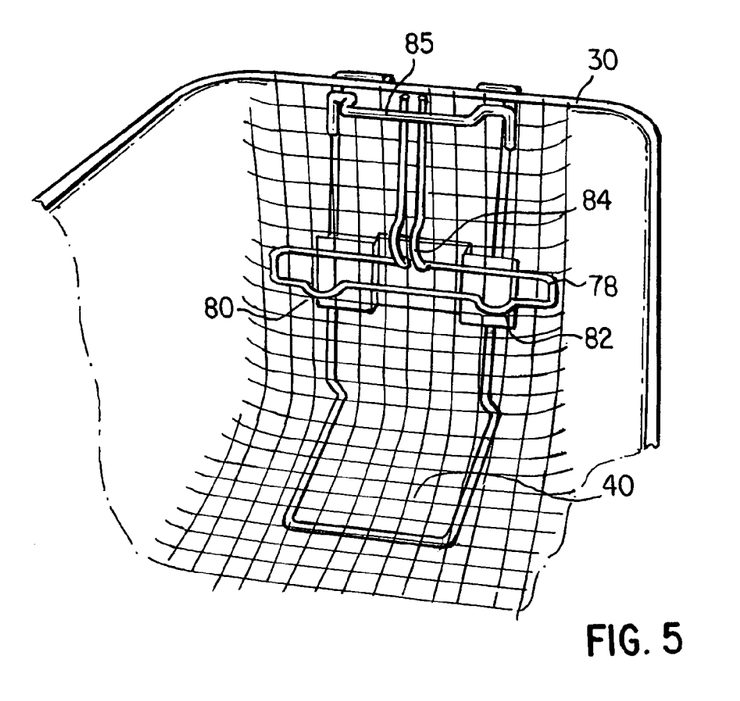
FIG. 5 is an elevational view of the inside rear wall of the basket showing the second part of the locking means for the insert.
Figure 6:
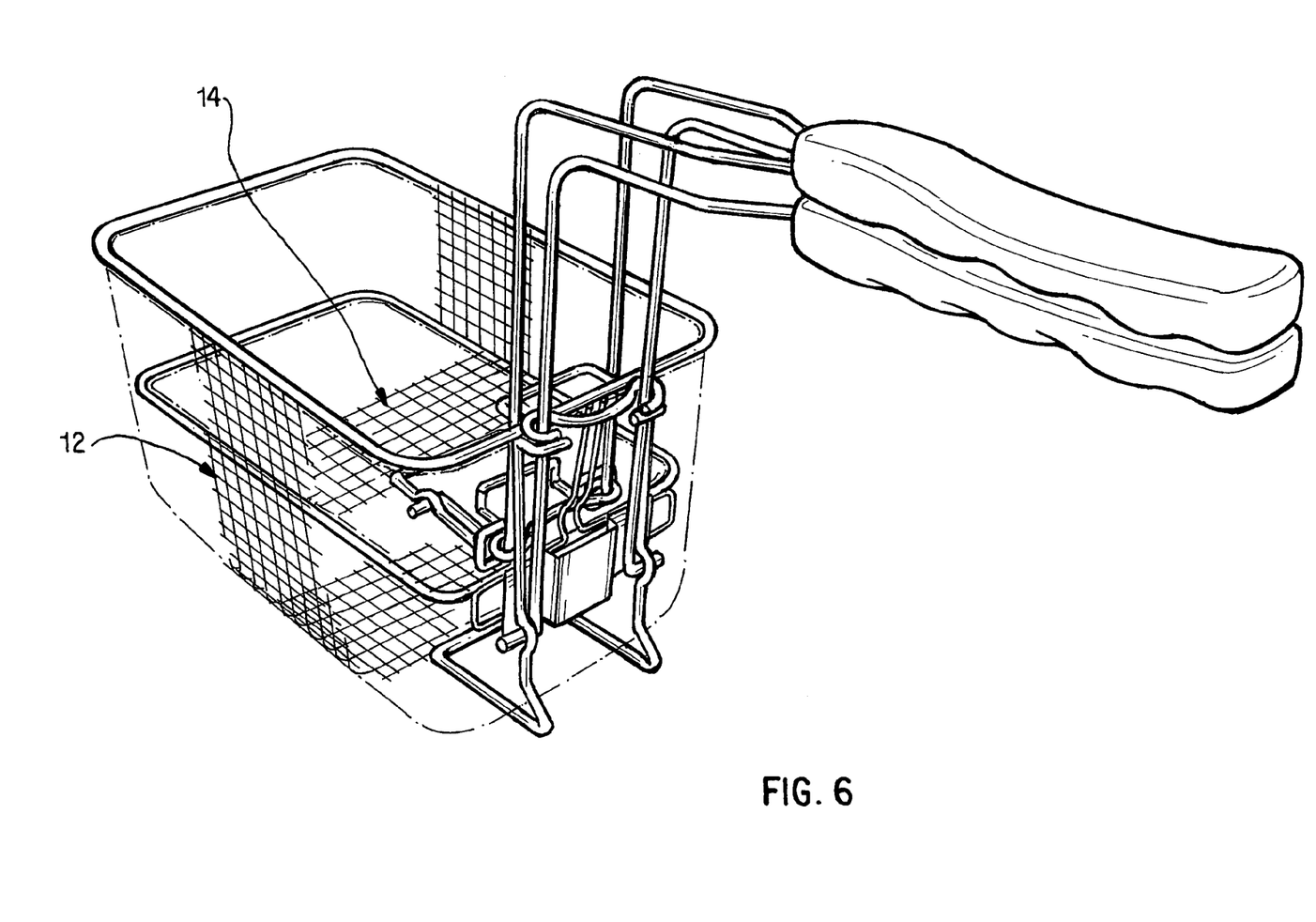
FIG. 6 is a perspective view showing the basket assembled with the insert.
Figure 7:
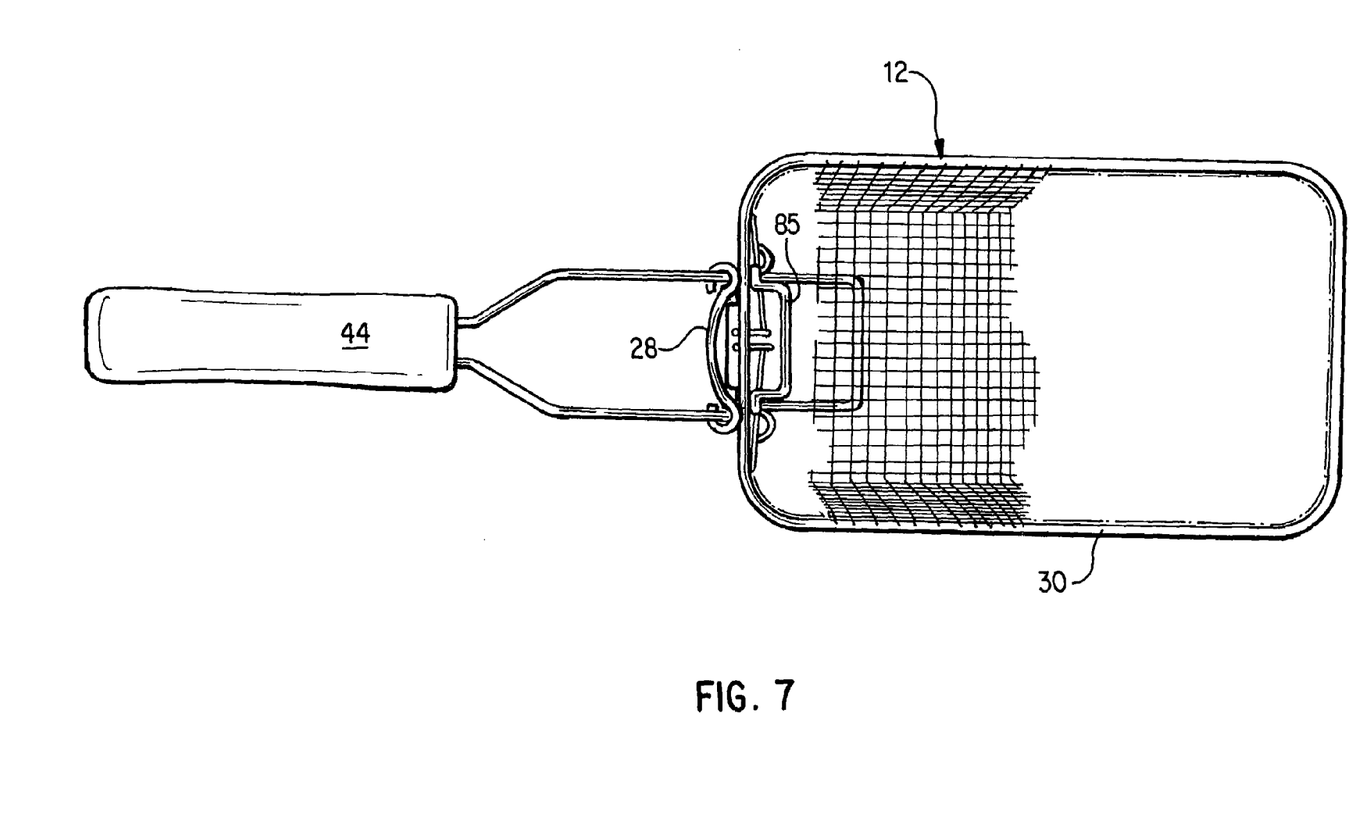
FIG. 7 is a plan view of the basket assembled with its handle.

A second insert support member 78 is fixed on the rear wall 38 by spot welding or any other means well-known in the art at the same predetermined distance between the top 30 and the bottom 40 as is first support member 70. Second support member 78 has a pair of inwardly extending protuberances 80 and 82 on which the other end of the insert 14 will rest and a pair of inwardly extending protuberances 84 over which the insert 14 must pass in order to come to rest on protuberances 80 and 82. Protuberances 84 are somewhat resilient to allow insert 14 to move past them. Legs 24 and 26 rest against inwardly directed spacer member 85 to assist in maintaining the insert 14 and handle 18 in their proper position. Once the insert is in place, resting on protuberances 72, 74, 80, and 82, food which is already in place will be held in the space between the bottom 40 and the insert 14 (see FIG. 6).

Figure 12:
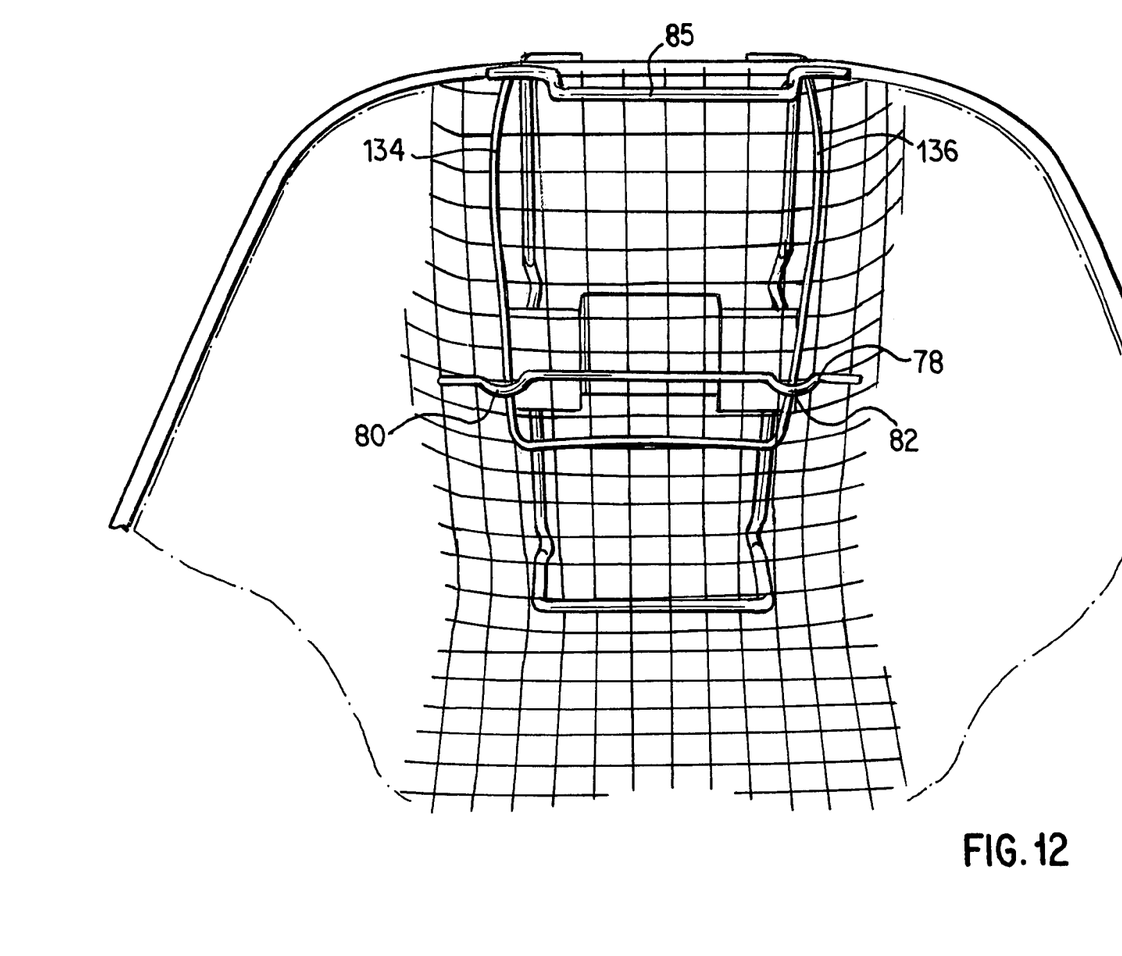
FIG. 12 is a perspective view from the rear and left side of a variation of the basket of the present invention.

In a variation shown in FIG. 12, second support member 78 has a pair of spaced-apart resilient spring-like portions 134 and 136 instead of protuberances 84.

Figure 8:
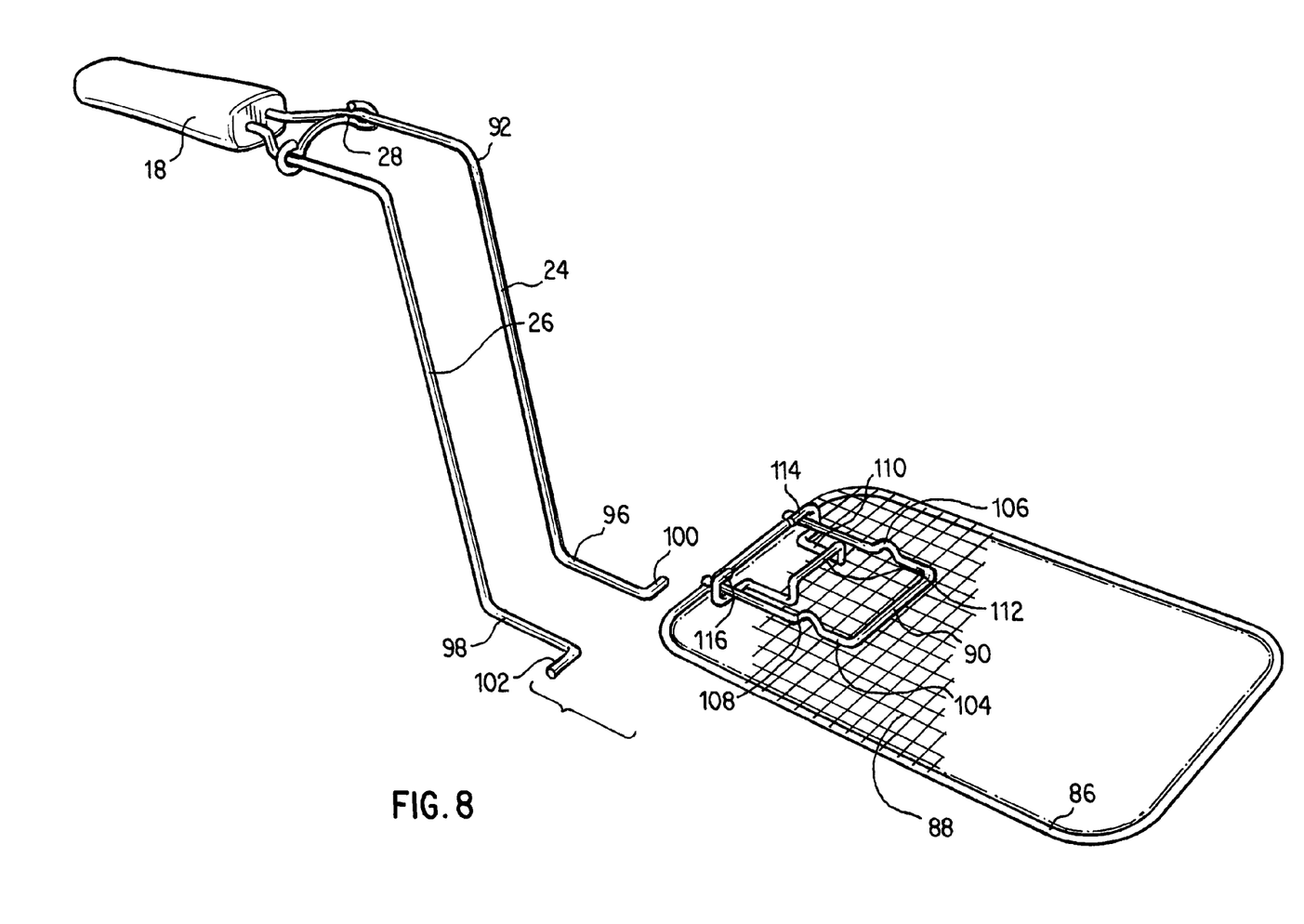
FIG. 8 is an exploded view of the insert and its handle.
Figure 9:
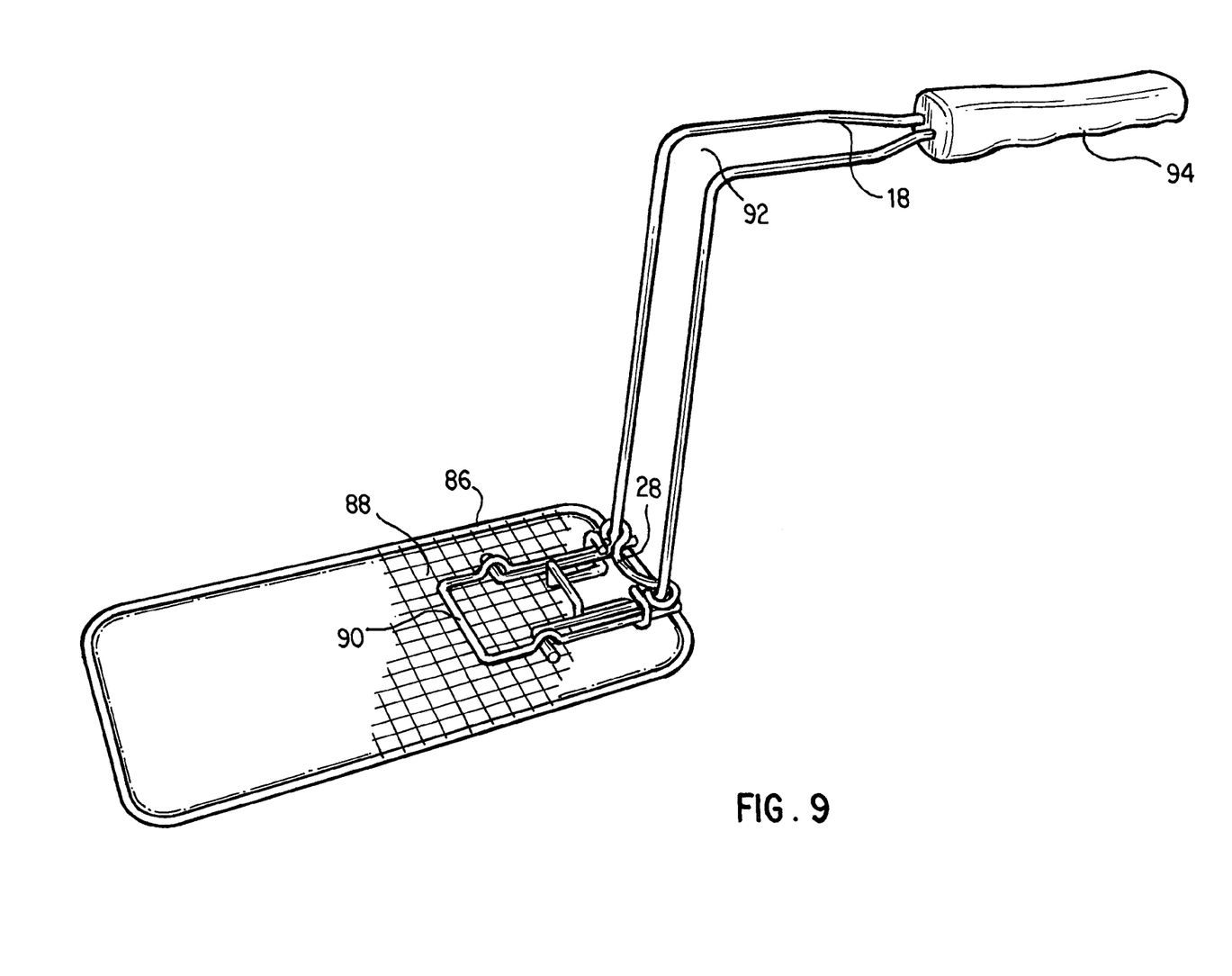
FIG. 9 is a perspective view of the insert assembled with its handle.

Turning to FIGS. 8 and 9, it will be seen that insert 14 comprises a frame 86 to which a foraminous member 88 is affixed. Handle 18 comprises a portion 92 which is generally horizontal as seen in FIGS. 1 and 9, portion 92 extending from handle 94 and forming separated elements which are then directed downwardly to form legs 24 and 26. Legs 24 and 26 are bent at a substantially right angle to form feet 96 and 98 which then terminate in outwardly directed lugs 100 and 102. Clip 28 is slidingly affixed to handle 18 such that when it is located in the upper, horizontal, portion 92, the legs 24 and 26 can be moved toward each other for insertion into position when attached to the insert 14, but when clip 28 is moved to the lower position, it prevents the legs 24 and 26 from being moved together, thereby locking them in place.

A handle support frame 90 is fixed at one end of member 88. Handle support frame 90 comprises member 104 which is essentially U-shaped with a pair of upstanding hook-like protuberances 106 and 108 extending from the legs thereof, and member 110 which is also essentially U-shaped. Member 110 has an upstanding portion 112 and a pair of hooks 114 and 116 which embrace the legs of the U-shaped member 104.

Handle 18 is attached to insert 14 by squeezing legs 24 and 16 together and inserting lugs 100 and 102 into protuberances 106 and 104. Legs 24 and 26 are further squeezed to allow feet 96 and 98 to be inserted into hooks 114 and 116 while upstanding portion 112 keeps feet 96 and 98 from moving too close together thereby preventing lugs 100 and 102 from slipping out of the protuberances 106 and 104. Clip 28 is then slid into place to lock legs 24 and 26 from coming together. As can be seen from FIG. 6, when the basket and insert are assembled, handles 16 and 18 extend sufficiently far from the basket to be safe to handle and are vertically separated so they can be easily manipulated.

Figure 13:
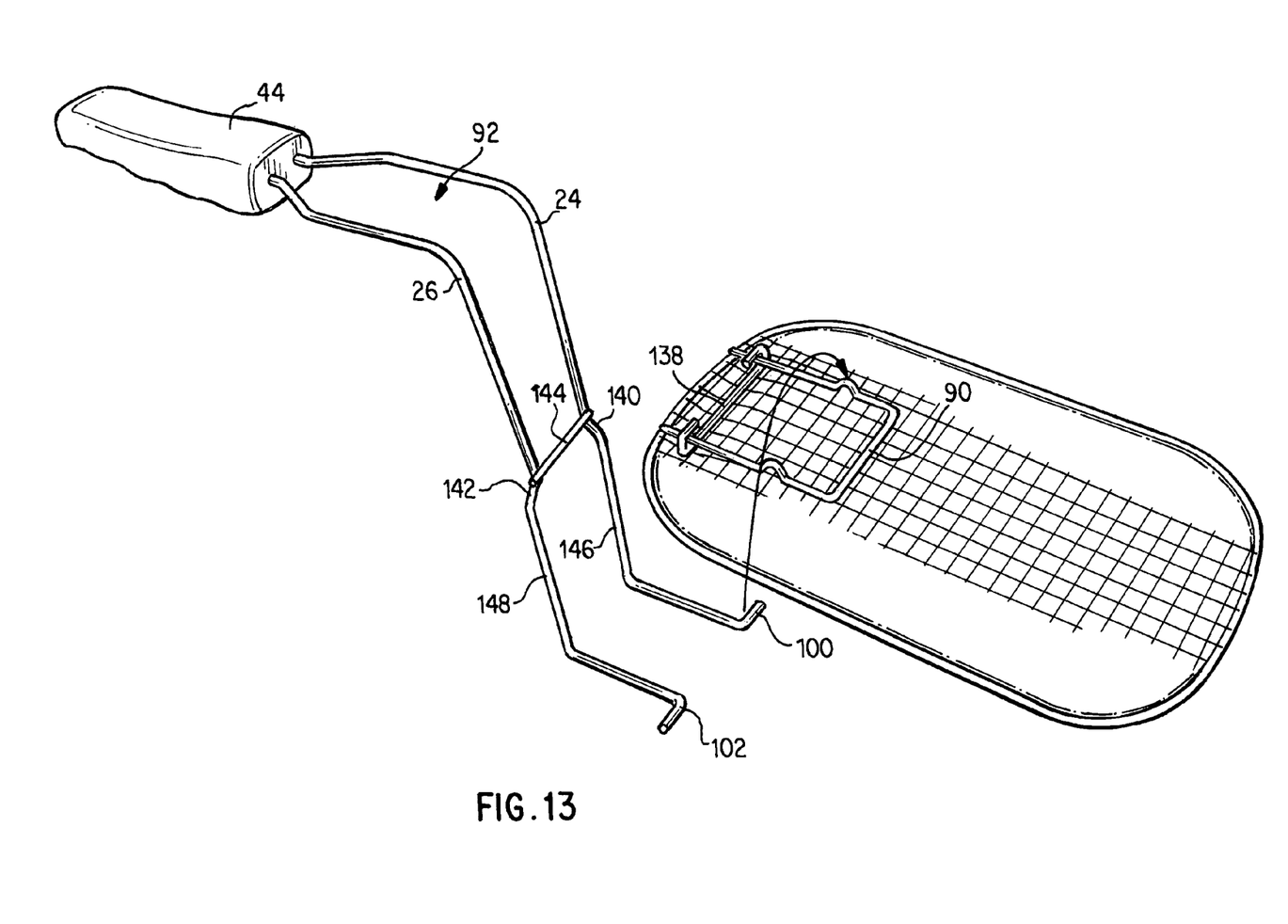
FIG. 13 is an exploded view of a variation of the insert and its handle.

In a variation of the insert, as shown in FIG. 13, the handle support frame 90 of insert 14 has a cross-bar 138. instead of elements 110, 112. The handle 18 is constructed in a manner similar to the handle 16 shown in FIG. 10. It comprises a generally horizontal portion 92 extending from handle grip 44 and forming separated elements which are then directed downwardly to form legs 24 and 26. Legs 24 and 26 are bent outwardly at 140 and 142, respectively, and then continue downwardly to terminate in outwardly directed lugs 100 and 102. Instead of a clip 28 as shown in FIG. 8, for instance, a cross-bar 144 is fixed to the legs 24 and 26 in the vicinity of portions 140 and 142 as by welding. This allows the lower portions 146 and 148 of the legs 24 and 26 to retain some resiliency so they can be moved toward each other for insertion into position when attached to the insert 14.

The method of cooking a food item according to this invention comprises placing the food item into basket 12, placing insert 14 into basket 12, and placing the basket into a deep fryer containing hot liquid so that the food item is submerged in the hot liquid. When the food item is to be deep fried, the hot liquid is oil. The steps of placing the insert in the basket and placing the basket in the hot liquid may be reversed. Similarly, the basket may be placed in the hot liquid, the food item then being placed in the basket, and finally the insert placed in the basket.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for cooking a food item in a hot liquid comprising:
    a basket having opposed foraminous side walls, opposed foraminous front and rear walls, a foraminous bottom, and an open top;
    a foraminous insert adapted to be insertable through the open top and to be removably locked in place at a predetermined position intermediate the top and bottom;
    a first handle affixed to the basket and extending upwardly and outwardly from said basket;
    a second handle affixed to the insert and extending upwardly and outwardly from said insert;
    a first insert support member fixed to said front wall at said predetermined position;
    a second insert support member fixed to said rear wall at said predetermined position, said first and second support members being adapted to lock said insert in position; and
    wherein said first support member comprises a pair of first inwardly extending protuberances on which one end of said insert will rest and a step extending inwardly and slightly downwardly to lock the insert in place, and wherein said second support member has a pair of second inwardly extending protuberances on which the other end of the insert will rest and a pair of third inwardly extending resilient protuberances over which the insert must pass in order to come to rest on said second inwardly extending protuberances.

2. An apparatus according to claim 1 wherein said hot liquid is oil.

3. An apparatus according to claim 1, wherein said second handle extends upwardly to a height above said first handle.

4. An apparatus according to claim 1, wherein said foraminous walls of said basket and said foraminous insert comprise a wire mesh.

5. A method for cooking a food item comprising
    placing the food item into a basket having foraminous opposed side walls, opposed foraminous front and rear-walls, a foraminous bottom, an open top, a first handle affixed to the basket and extending upwardly and outwardly from said basket, a first insert support member fixed to said front wall at said predetermined position, and a second insert support member fixed to said rear wall at said predetermined position, wherein said first and second support members are adapted to lock said insert in position, wherein said first support member comprises a pair of first inwardly extending protuberances on which one end of said insert will rest and a step extending inwardly and slightly downwardly to lock the insert in place, and wherein said second support member has a pair of second inwardly extending protuberances on which the other end of the insert will rest and a pair of third inwardly extending resilient protuberances over which the insert must pass in order to come to rest on said second inwardly extending protuberances;
    placing a foraminous insert into said basket through said open top at a predetermined position intermediate the top and bottom wherein the foraminous insert is adapted to be insertable through the open top and to be removably locked in place at a predetermined position intermediate the top and bottom and wherein a second handle is affixed to the insert extending upwardly and outwardly from said insert; and
    placing the basket into a deep fryer containing hot liquid so that the food item is submerged in the hot liquid.

6. A method according to claim 5, wherein said hot liquid is oil.

7. A method for cooking a food item comprising
    placing the food item into a basket having opposed foraminous side walls, opposed foraminous front and rear walls, a foraminous bottom, an open top, a first handle affixed to the basket and extending upwardly and outwardly from said basket, a first insert support member fixed to said front wall at said predetermined position, and a second insert support member fixed to said rear wall at said predetermined position, wherein said first and second support members are adapted to lock said insert in position, wherein said first support member comprises a pair of first inwardly extending protuberances on which one end of said insert will rest and a step extending inwardly and slightly downwardly to lock the insert in place, and wherein said second support member has a pair of second inwardly extending protuberances on which the other end of the insert will rest and a pair of third inwardly extending resilient protuberances over which the insert must pass in order to come to rest on said second inwardly extending protuberances;
    placing the basket into a deep fryer containing hot liquid; and
    placing a foraminous insert into said basket through said open top at a predetermined position intermediate the top and bottom, so that the food item is submerged in the hot liquid, wherein the foraminous insert is adapted to be insertable through the open top and to be removably locked in place at a predetermined position intermediate the top and bottom and wherein a second handle is affixed to the insert extending upwardly and outwardly from said insert.

8. A method for cooking a food item comprising placing a basket having opposed foraminous side walls, opposed foraminous front and rearwalls, a foraminous bottom, an open top, a first handle affixed to the basket and extending upwardly and outwardly from said basket, a first insert support member fixed to said front wall at said predetermined position, and a second insert support member fixed to said rear wall at said predetermined position, wherein said first and second support members are adapted to lock said insert in position, wherein said first support member comprises a pair of first inwardly extending protuberances on which one end of said insert will rest and a step extending inwardly and slightly downwardly to lock the insert in place, and wherein said second support member has a pair of second inwardly extending protuberances on which the other end of the insert will rest and a pair of third inwardly extending resilient protuberances over which the insert must pass in order to come to rest on said second inwardly extending protuberances into a deep fryer containing hot liquid;

placing the food item into said basket; and placing a foraminous insert into said basket through said open top at a predetermined position intermediate the top and bottom, so that the food item is submerged in the hot liquid, wherein the foraminous insert is adapted to be insertable through the open top and to be removably locked in place at a predetermined position intermediate the top and bottom and wherein a second handle is affixed to the insert extending upwardly and outwardly from said insert.

9. A method according to claim 7, wherein said hot liquid is oil.

10. A method according to claim 8, wherein said hot liquid is oil.

* * * * *